July 8, 1958
D. PERLMAN
2,842,540
PREPARATION OF NEW COBALAMINS
Filed Oct. 1, 1956
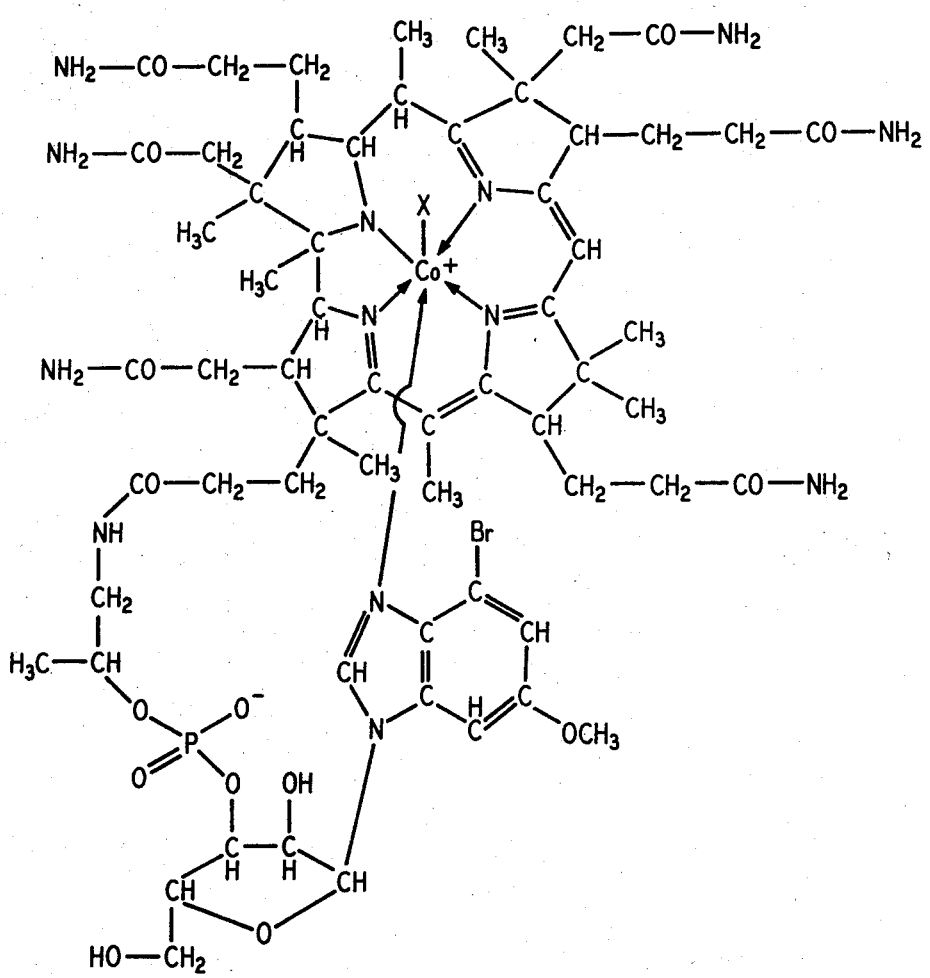
DAVID PERLMAN Inventor
By Lawrence S. Levinson
Attorney

United States Patent Office 2,842,540
Patented July 8, 1958

2,842,540

PREPARATION OF NEW COBALAMINS

David Perlman, Princeton, N. J., assignor to Olin Mathieson Chemical Corporation, New York, N. Y., a corporation of Virginia Application October 1, 1956, Serial No. 613,341

3 Claims. (Cl. 260—211.5)

This invention relates to new cobalamins and, more particularly, to 4-bromo-6-methoxy-benzimidazole-hydroxo-cobalamin and salts thereof [the nomenclature herein is based on Bernhauer et al., Angew. Chemie, 66, 776 (1954)].

The new compounds of this invention may be represented by the structural formula in the appended drawing, wherein X is a hydroxy radical or the anion of an acid, preferably a pharmacologically acceptable acid. Examples of suitable anions are the anions of the mineral acids (e. g., chloride, bromide, sulfate, nitrite and nitrate), cyanide, cyanate, etc. The compounds of this invention can thus be termed 4-bromo-6-methoxy-benzimidazole-X-cobalamins, wherein X represents the anionic radical (e. g., 4-bromo-6-methoxy-benzimidazole-hydroxy-cobalamin; 4-bromo-6-methoxy-benzimidazole-cyano-cobalamin; 4 - bromo - 6 - methoxy - benzimidazole-chloro - cobalamin; and 4 - bromo - 6 - methoxy-benzimidazole-sulfato-cobalamin). The compounds of this invention are biologically active and, hence, can be used in lieu of vitamin $B_{12}$ (5,6-dimethylbenzimidazole-cyano-cobalamin) in promoting growth of chicks. For this purpose, they are administered in the same manner as vitamin $B_{12}$ (e. g., as supplements to chick feeds or by injection), the respective dose of the particular 4-bromo-6-methoxy-benzimidazole-cobalamin depending on its potency relative to vitamin $B_{12}$.

To prepare the 4-bromo-6-methoxy-benzimidazole-cyanocobalamin of this invention, *Propionibacterium arabinosum* is grown under substantially anaerobic conditions in a suitable nutrient medium containing a precursor such as 4-bromo-6-methoxy-benzimidazole or 3-bromo-5-methoxy-phenylenediamine-1,2, or their salts and other derivatives based on the functional amino group. The sources of carbon, nitrogen and cobalt, utilizable as media components in this process, are those normally employed in the preparation of vitamin $B_{12}$. The resultant 4 - bromo - 6 - methoxy - benzimidazole - hydroxo-cobalamin is then converted, in situ, to 4-bromo-6-methoxy-benzimidazole-cyano-cobalamin by treatment of the culture or separated cells (preferably the latter) with potassium cyanide or other cyanide containing salt, and the cyano-cobalamin is isolated as more fully detailed in Example 1. The resultant cyano-cobalamin can then be converted to hydroxo-cobalamin and thence to other salts of 4-bromo-6-methoxy-benzimidazole-cobalamin by methods known in the art [see Kaczka et al., Jour. Amer. Chem. Soc., 73, 3569 (1951)] to yield products which are also biologically active.

The following examples illustrate the invention (all temperatures being in centigrade):

EXAMPLE 1

*4-bromo-6-methoxy-benzimidazole-cyano cobalamin*
*(X=CN)*

Thirty liters of a medium containing (per liter): glucose, 30 g.; autolyzed yeast, 20 g.; $Co(NO_3)_2 \cdot 6H_2O$, 0.01 g.; tap water, 1 liter; are placed in a stainless steel fermentation unit of 38 liters capacity, heated at 121° for 30 minutes and cooled to 30°. About 2,000 ml. of a slurry of $CaCO_3$ (containing 600 g. of $CaCO_3$), sterilized by autoclaving, is then added together with 1 liter of *Propionibacterium arabinosum* (American Type Culture Collection catalogue number 4965, Washington, D. C. culture grown on this medium for 72 hours in flasks shaken on a reciprocating shaker (120—1 inch strokes per minute), located in a 30° constant temperature room. A sterile aqueous-alcoholic solution of 3-bromo-5-methoxy-phenylenediamine-1,2 (sterilized by filtration through a fritted glass filter) containing 1 mg. per ml, is then added so that the final concentration of added compound is 5 mg. per liter (this supplementation being repeated at 24-hour intervals), and the culture is allowed to grow in the medium, under virtually anaerobic conditions while being agitated with a turbine mixer rotating at 87 R. P. M. After 72 hours incubation at 30°, a sterile solution of glucose is added so that the concentration of the glucose after addition is 30 g. per liter. After 5 days of incubation, the pH of the mixture is about 5.3. The fermented medium is then passed through a Sharples Super Centrifuge, or the cells containing 4-bromo-6-methoxy-benzimidazole-hydroxo-cobalamin are separated by filtration through a bed of filter-aid (Celite).

The collected cells are resuspended in 3 liters of propanol-water (80:20) containing 1 g./liter of potassium cyanide, and the suspension is heated at 80–90° for 20 minutes. After filtration, the filtrate is concentrated to about 750 ml. The pH is adjusted with 10 N sodium hydroxide to about 7.5, and 25 g. of activated carbon (Darco G60) is added and the mixture stirred. The activated carbon is removed by filtration and eluted with 700 ml. of acetone-water (65:35 v./v.), containing 0.1 g./liter of potassium cyanide. The acetone is concentrated to 400 ml., and filtered to remove suspended material. After filtration, the filtrate is successively extracted with three equal volumes of phenol-benzene (70 parts 88% phenol—30 parts benzene). The non-aqueous layer is separated, pooled and diluted with benzene so that the ratio of benzene to phenol is 15:1. The solution is extracted three times with 200 ml. portions of water, and the aqueous extracts are pooled and concentrated to about 50 ml. The resultant solution is mixed with 1.5 volumes of benzyl alcohol, and the rich-water is saturated with ammonium sulfate. The benzyl alcohol layer is separated, and the aqueous layer is reextracted with one-tenth its volume of benzyl alcohol. The rich benzyl alcohol extracts are combined and dried with sodium sulfate and chromatographed on an activated alumina column. The column is washed with 1 part of methanol and 2 parts of acetone. The rich material is eluted with methanol and the elute dried under vacuum. The residue is dissolved in a minimum of water and acetone is added until slightly turbid. On standing for several days, 4-bromo-6-methoxy-benzimidazole-cyano-cobalamin in the form of red needlelike crystals are recovered. Spectroscopic examination shows maxima at 278, 361, 520 and 550 mu [$E_{1cm.}^{1\%}$ 204 (361)].

To show the homogeneity and activity of the 4-bromo-6-methoxy-benzimidazole-cyano-cobalamin of this invention, the following tests were conducted. For these tests the cyano-cobalamin was dissolved in water at a concentration of 100 micrograms of cyano-cobalamin per ml. of water:

TEST I

The solution of 4-bromo-6-methoxy-benzimidazole-cyano-cobalamin is dried on a filter paper strip of Whatman 3 MM paper in parallel with samples of 5,6-dimethyl-benzimidazole-cyano-cobalamin, adenine - cyano-cobalamin, 2-methyl-adenine-cyano-cobalamin, and Ford's factor B [Ford et al., Biochem. Jour., 59, 86 (1955)]. The sheet is placed in an ionophoresis apparatus [similar to that described by Holdsworth in Nature, 171, 148 (1953)], and the paper is impregnated with a solution of 0.5 M acetic acid containing 0.02% KCN (w./v.). A potential of about 280 volts is applied for about 17 hours. The sheet is removed and dried. When dry (and free from odor of acetic acid), it is applied for 15 minutes to the surface of an agar plate seeded with a suspension of a vitamin $B_{12}$-requiring strain of Escherichia coli (ATCC 11105). [The agar medium contains (grams/liter): sucrose, 20 g.; citric acid, 1.2 g.; $(NH_4)_2PO_4$, 0.4 g.; KCl, 0.08 g.; $MgCl_2.6H_2O$, 0.418 g.; $MnCl_2.4H_2O$, 0.036 g.; $FeCl_3.6H_2O$, 0.023 g.; $ZnCl_2$, 0.021 g.; $CoCl_2.6H_2O$, 0.04 g.; agar, 15 g.; triphenyl tetrazolium chloride, 1 g.] After 18 hours incubation at 37°, the agar plate is observed. The positions of zones of growth of the bacteria (noted as red zones due to the reduction of the tetrazolium dye to the colored formazan) are noted in relation to the location on the paper strip where the samples were applied. When the samples from the fermentation supplemented with the 3-bromo-5-methoxy-phenylenediamine-1,2 are analyzed in this way, zones of growth parallel to those obtained when 5,6-dimethylbenzimidazole-cyano-cobalamin (neutral ionophoretically), adenine-cyano-cobalamin and factor B are found, with the largest zone in the "neutral" area.

TEST II

Another aliquot of the solution is applied to a spot about 3 inches from the end of a strip of Whatman No. 4 filter paper parallel to spots of known cobalamins. The chromatogram is developed by the descending method using a solvent mixture containing: sec.-butanol, 77 ml.; $H_2O$, 23 ml.; KCN solution (5% w./v.), 0.25 ml.; and $KClO_4$, 100 mg., for 24 hours (at 35°). The strip is dried and applied to the seeded agar plate as above. After incubation, the zones of growth, representing the presence of vitamins of the $B_{12}$ group (measured with reference to the movement of 5,6-dimethylbenzimidazole-cyano-cobalamin), were 0.95, with smaller zones of growth corresponding to 0.4 (adenine-cyano-cobalamin) and 1.45 (factor B).

TEST III

Another aliquot of the solution is applied to a spot about 3 inches from the end of strip of Whatman No. 4 filter paper parallel to spots of known cobalamins. The chromatogram is developed by the descending method using a solvent mixture containing: sec.-butanol, 100 ml.; $H_2O$, 50 ml.; KCN [5% solution (w./v.)], 0.25 ml.; acetic acid (glacial), 1.0 ml. After 17 hours development (at 35° C.), the strips are dried and plated on seeded agar plates as above. Zones of growth parallel to those obtained when the 5,6-dimethylbenzimidazole-cyano-cobalamin was added are found with smaller zones in the area of mobility about 0.35 and 1.45 that of the 5,6-dimethylbenzimidazole-cyano-cobalamin (corresponding to adenine-cyano-cobalamin and factor B respectively).

TEST IV

Another aliquot is assayed for the presence of substances stimulating the growth of Lactobacillus leichmannii (ATCC 7830) using as standard 5,6-dimethylbenzimidazole-cyano-cobalamin and the method in the U. S. Pharmacopia (15th edition). A value of about 0.9 mg. per liter is obtained. A second aliquot is assayed by the method of Ford and Porter [Brit. J. Nutrition, 7, 326 (1953)], using the growth response of Ochromonas malhamensis, and the 5,6-dimethylbenzimidazole-cyano-cobalamin as standard; a value of about 0.53 mg. per liter is obtained. When an aliquot from an unsupplemented fermentation is analyzed by these procedures, no growth stimulation of the Ochromonas culture is found (less than 0.003 mg. per liter), and no evidence for production of ionophoretically neutral cobalamins is obtained.

TEST V

Another aliquot is assayed for the presence of substances stimulating the growth of chicks, using the procedure described by Lillie et al. [Poultry Science, 33, 686 (1954)] with replacement of BY500 and bone meal with riboflavin and dicalcium phosphate. After 4 weeks' growth, the chicks grown on the ration supplemented with the 4-bromo-6-methoxy-benzimidazole-cyano-cobalamin were approximately equal in weight to those grown on the ration supplemented with an equal weight (based on the Lactobacillus leichmannii bioassay) of vitamin $B_{12}$.

EXAMPLE 2

4-bromo-6-methoxy-benzimidazole-hydroxo-cobalamin (X=OH)

To a solution of 10 mg. of 4-bromo-6-methoxy-benzimidazole-cyano-cobalamin in 10 ml. of water is added 50 mg. of platinum oxide catalyst, and the mixture is shaken with hydrogen at atmospheric pressure for 24 hours. The filtrate from the catalyst is evaporated in vacuo at 25°. The residue is dissolved in 1 ml. of water and 12 ml. of acetone are added. Dark red crystals of 4-bromo-6-methoxy-benzimidazole-hydroxo-cobalamin are found on standing for several days. Spectroscopic examination shows maxima at 315, 352, 415 and 530 m$\mu$ [$E_{1cm.}^{1\%}$ 170].

EXAMPLE 3

4-bromo-6-methoxy-benzimidazole-chloro-cobalamin (X=Cl)

10 mg. of 4-bromo-6-methoxy-benzimidazole-hydroxo-cobalamin is dissolved in 3 ml. of water and the solution adjusted to pH 4 with 0.1 N hydrochloric acid. The solution is then diluted with 10 ml. of acetone, and after a short time the chloro-cobalamin begins to crystallize in the form of dark red needles. The crystals are separated by centrifuging, washed with acetone and dried.

Similarly, by substituting hydrobromic acid, sodium nitrite and acetic acid, potassium cyanate and dilute sulfuric acid for the hydrochloric acid in the procedure of Example 3, the corresponding bromo, nitro, cyanato and sulfato-cobalamins, respectively, are obtained.

The invention may be otherwise variously embodied within the scope of the appended claims.

I claim:

1. A compound selected from the class consisting of 4-bromo-6-methoxy-benzimidazole-hydroxo-cobalamin and salts thereof.
2. 4-bromo-6-methoxy-benzimidazole-hydroxo-cobalamin.
3. 4-bromo-6-methoxy-benzimidazole-cyano-cobalamin.

References Cited in the file of this patent

UNITED STATES PATENTS

| | | |
|---|---|---|
| 2,595,499 | Wood et al. | May 6, 1952 |
| 2,650,896 | McDaniel et al. | Sept. 1, 1953 |
| 2,719,843 | Davoll et al. | Oct. 4, 1955 |
| 2,728,763 | Mamalis et al. | Dec. 27, 1955 |
| 2,763,642 | Porter et al. | Sept. 18, 1956 |

OTHER REFERENCES

Bernhauer et al.: "Angewandte Chemie," 66: 24, Dec. 21, 1954, pp. 776–780 relied on.